(12) United States Patent
Wieland

(10) Patent No.: US 8,163,428 B2
(45) Date of Patent: Apr. 24, 2012

(54) FUEL CELL SYSTEM AND METHOD FOR OPERATING THE SAME

(75) Inventor: Steffen Wieland, Heilbronn (DE)

(73) Assignee: Enymotion GmbH, Heilbronn (DE)

( * ) Notice: Subject to any disclaimer, the term of this patent is extended or adjusted under 35 U.S.C. 154(b) by 745 days.

(21) Appl. No.: 12/274,238

(22) Filed: Nov. 19, 2008

(65) Prior Publication Data

US 2009/0130501 A1    May 21, 2009

(30) Foreign Application Priority Data

Nov. 19, 2007    (DE) .......................... 10 2007 055 179

(51) Int. Cl.
*H01M 8/06* (2006.01)
(52) U.S. Cl. ......... 429/423; 429/429; 429/441; 429/512
(58) Field of Classification Search .................. 429/423, 429/429, 441, 512
See application file for complete search history.

(56) References Cited

U.S. PATENT DOCUMENTS

| | | | |
|---|---|---|---|
| 5,019,463 A | 5/1991 | Matsubara et al. | |
| 5,573,867 A * | 11/1996 | Zafred et al. | 429/423 X |
| 6,290,877 B2 | 9/2001 | Naka et al. | |
| 6,641,944 B2 * | 11/2003 | Kawasumi et al. | 429/429 X |
| 6,991,663 B2 * | 1/2006 | Abe | 429/423 X |
| 7,101,513 B2 | 9/2006 | Naka et al. | |
| 2001/0002043 A1 | 5/2001 | Naka et al. | |
| 2002/0030175 A1 | 3/2002 | Naka et al. | |
| 2002/0071972 A1 | 6/2002 | Gebhardt et al. | |
| 2003/0091875 A1 | 5/2003 | Gebhardt et al. | |
| 2003/0190507 A1 | 10/2003 | Doctor et al. | |
| 2006/0210848 A1 | 9/2006 | Schiegal et al. | |
| 2008/0102327 A1 | 5/2008 | Doctor et al. | |

FOREIGN PATENT DOCUMENTS

| | | |
|---|---|---|
| AU | 2006201057 B2 | 10/2006 |
| CA | 2367128 A1 | 9/2000 |
| CA | 2408565 A1 | 11/2002 |
| CA | 2617308 A1 | 9/2006 |
| CN | 11441974 A | 9/2003 |
| DE | 19910387 A1 | 9/2000 |
| DE | 19945713 A1 | 4/2001 |
| DE | 10059578 A1 | 6/2001 |
| DE | 10023036 A1 | 11/2001 |
| DE | 10155543 A1 | 5/2003 |
| DE | 10213134 A1 | 10/2003 |
| DE | 10232870 A1 | 2/2004 |

(Continued)

*Primary Examiner* — Stephen J. Kalafut
(74) *Attorney, Agent, or Firm* — Carlson, Gaskey & Olds, PC.

(57) ABSTRACT

The invention relates to a fuel cell system and method comprising a reformer with a thermal starting device, at least one gas processing stage downstream of the reformer, at least one fuel cell disposed downstream of the gas processing stage and a plurality of bipolar plates, the fuel cell having an inner region of a reaction with anode, cathode and electrolyte, and an outer region with at least one cooling channel permitting a coolant to flow through the cooling channel, wherein the outer region is not in fluid connection with the inner region. Upstream of the fuel cell, the fuel cell system has a switching device, which is switchable between a start-up position and an operating position, wherein in the operating position the product gases from the reformer and/or the thermal starting device are guided to the inner region of the fuel cell.

15 Claims, 3 Drawing Sheets

FOREIGN PATENT DOCUMENTS

| | | |
|---|---|---|
| DE | 20320913 U1 | 6/2005 |
| EP | 1351330 A3 | 10/2003 |
| EP | 1703578 A1 | 9/2006 |
| EP | 1383188 A3 | 12/2006 |
| JP | 02139871 | 5/1990 |
| WO | 0054355 A1 | 9/2000 |
| WO | 0186745 A3 | 11/2001 |
| WO | 2004079846 A2 | 6/2004 |

* cited by examiner a) b)

Start of Reformer

US 8,163,428 B2

FUEL CELL SYSTEM AND METHOD FOR OPERATING THE SAME

CROSS REFERENCE TO RELATED APPLICATIONS

The present application claims priority to co-pending German Patent Application No. DE 10 2007 055 179.9 filed Nov. 19, 2007; entitled "FUEL CELL SYSTEM AND METHOD FOR OPERATING THE SAME", the entirety of which is incorporated herein by reference.

FIELD

The present embodiments relate to a fuel cell system and method of operating comprising a reformer with a thermal starting device, at least one gas processing stage downstream of the reformer, at least one fuel cell disposed downstream of the gas processing stage and a plurality of bipolar plates, the fuel cell having an inner region of a reaction with anode, cathode and electrolyte, and an outer region with at least one cooling channel permitting a coolant to flow through, wherein the outer region is not in fluid connection with the inner region.

Upstream of the fuel cell, the fuel cell system has a switching device, which is switchable between a start-up position and an operating position, wherein in the operating position the product gases from the reformer and/or the thermal starting device are guided to the inner region of the fuel cell.

BACKGROUND

Fuel cells are electrochemical energy converters, which can generate current in an environment-friendly manner with regard to noise emission and energy efficiency. To this end, fuel cells convert hydrogen or fuels containing hydrocarbons directly into electrical current. As fuel for the fuel cell, hydrogenous synthesis gas is produced from hydrocarbon. Using fuels containing hydrocarbons, hydrocarbon with air and water vapor is transformed in hydrogen and other byproducts, such as carbon dioxide and carbon monoxide, in a reformer. Depending on the required purity degree, which is defined by the fuel cell type used, at least one or more gas processing stages can be provided. In order to heat up, the reformer is during the start heated by means of a thermal starting device, in particular a gas burner, in which a complete combustion is accomplished.

Prior art, such as DE 100 59 578 A1 discloses the start of a methanol system through the complete combustion of methanol. DE 199 45 713 A1 describes the heating of fuel cells by heating the process air through the use of waste heat from a reformer by interposing filters.

In particular high-temperature fuel cells, such as described in DE 101 55 543, should for an efficient mode of operation be operated above a temperature of 100° C. When being operated, this type of fuel cells has a low sensitivity with regard to the byproducts in the product gases from the reformer.

A need exists for a fuel cell which can generate current in an environment-friendly manner with regard to noise emission and energy efficiency.

The present embodiments meet these needs.

BRIEF DESCRIPTION OF THE DRAWINGS

The detailed description will be better understood in conjunction with the accompanying drawings as follows.

Figure 1:
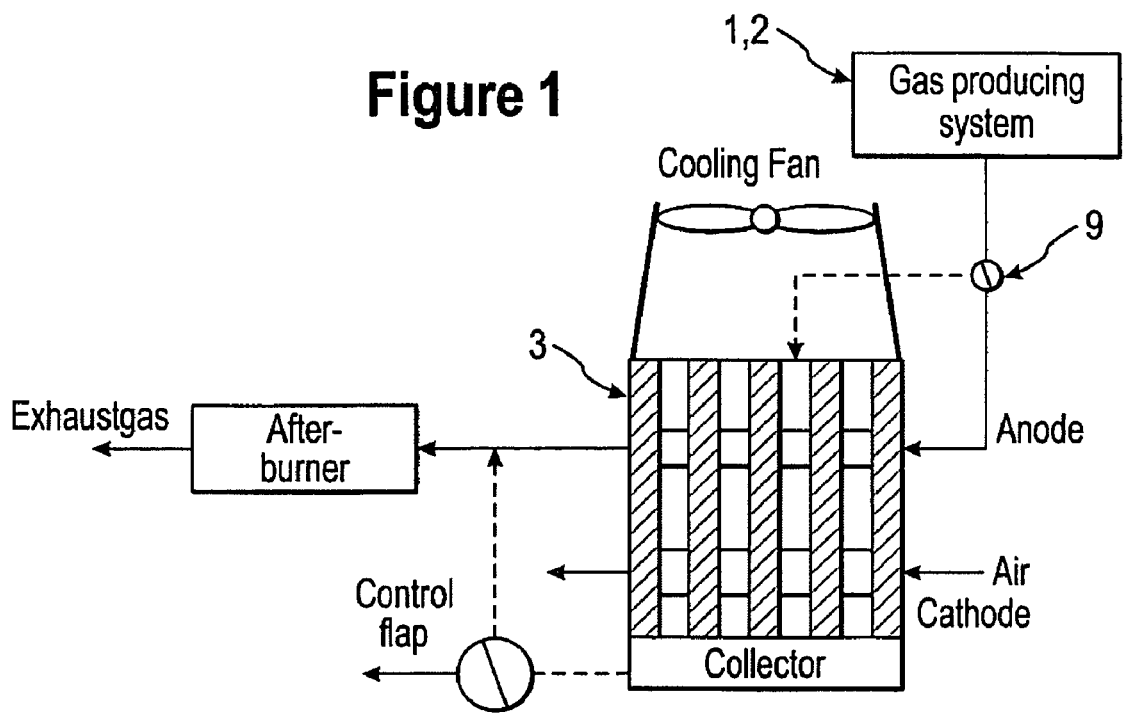
FIG. 1 depicts an embodiment of the invention and shows schematically in a dashed line the interconnection of the fuel cell stack during the start-up phase and in a solid line the interconnection during the operating phase.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a fuel cell system and method of operating comprising a reformer with a thermal starting device, at least one gas processing stage downstream of the reformer, at least one fuel cell disposed downstream of the gas processing stage and a plurality of bipolar plates, the fuel cell having an inner region of a reaction with anode, cathode and electrolyte, and an outer region with at least one cooling channel permitting a coolant to flow through, wherein the outer region is not in fluid connection with the inner region.

Upstream of the fuel cell, the fuel cell system has a switching device, which is switchable between a start-up position and an operating position, wherein in the operating position the product gases from the reformer and/or the thermal starting device are guided to the inner region of the fuel cell.

Fuel cells are electrochemical energy converters, which can generate current in an environment-friendly manner with regard to noise emission and energy efficiency. To this end, fuel cells convert hydrogen or fuels containing hydrocarbons directly into electrical current. As fuel for the fuel cell, hydrogenous synthesis gas is produced from hydrocarbon. Using fuels containing hydrocarbons, hydrocarbon with air and water vapor is transformed in hydrogen and other byproducts, such as carbon dioxide and carbon monoxide, in a reformer. Depending on the required purity degree, which is defined by the fuel cell type used, at least one or more gas processing stages can be provided. In order to heat up, the reformer is during the start heated by means of a thermal starting device, in particular a gas burner, in which a complete combustion is accomplished.

The lasting performance of a fuel cell depends in particular on the correct mode of operation of the catalysts, which, together with anode, cathode and electrolyte, are disposed in the inner reaction region. If, during the start-up phase, for example, unburned residues or undesired byproducts, in particular soot, from the combustion reaction of the thermal starting device or with product gases from the reformer get into the inner region of the fuel cell, i.e. the region where the fuel cell reactions take place, particularly the anode of the fuel cell, its mode of operation can be impeded. Further, the anode side of the fuel cell is due to residual hydrogen, which can under certain circumstances burn off there in a thermally uncontrolled manner, is sensitive to air. In particular in the case of high-temperature fuel cells, no liquid water should be generated due to the risk of a washing-out of the electrolyte and thus output losses during the start-up phase.

Thus, heating the fuel cell directly to the required working temperature of above 100° C. by means of the exhaust gases from the thermal starting device or the product gases from the reformer is problematic. The fuel cell itself is commonly heated by electrical heating or by heating the process air via heat exchanger, for example.

The embodiments of the invention provide a fuel cell system as well as a method for operating the same, which overcomes the disadvantages of the prior art and uses in particular the waste heat from the reformer, in particular during the start of the fuel cell system, in a constructively and procedurally simple manner. It is another object of the invention to be able to quickly start the fuel cell system, in particular high-temperature fuel cell systems, without detrimental effects due to undesired reactions in the inner reaction region of the fuel cell(s).

The fuel cell system comprises a reformer with a thermal starting device, at least one gas processing stage downstream of the reformer and at least one fuel cell disposed downstream of the gas processing stage and comprising a plurality of bipolar plates, the fuel cell having an inner region of a reaction, in particular with anode, cathode and electrolyte, and an outer region with at least one cooling channel permitting a coolant to flow through, wherein the outer region is not in fluid connection with the inner region. According to the invention, a switching device is provided upstream of the fuel cell, which is switchable between a start-up position, wherein in the start-up position product gases from the reformer and/or the thermal starting device are at least during the starting operation guided over the outer region of the fuel cell so as to heat the fuel cell, and at least one operating position, wherein in the operating position the product gases from the reformer and/or the thermal starting device are guided to the inner region of the fuel cell.

According to the invention, it is from a constructional point of view thus intended to provide a thermal connection between the inner region, e.g. the anode, and the at least one cooling channel or cooling channels, respectively, in the outer region of the fuel cells, into which the still hot waste gases from a thermal starting device are guided during the heating-up phase of the reformer. Thus, there is a thermic connection from the cooling channels to the anode, but also to the cathode side of the fuel cell. Advantageously, these cooling channels are formed as air channels for cooling the fuel cell during the normal operating phase by means of air. According to the invention, a good heat connection is thus provided without a fluid connection between the respective inner region and the respective outer region.

According to the invention, in order to prevent the anode side of the air-sensitive fuel cell from damage due to residual hydrogen, which can burn off there in a thermally uncontrolled manner, and in order to prevent liquid water from being generated in view of the risk of a washing-out of the electrolyte and thus output losses during the start-up phase, in particular in the case of high-temperature fuel cells, a respective multiway valve is provided upstream of the fuel cell for diverting the product gases from the reformer and/or the thermal starting device to the outer region when the machine is being started.

During the normal operating phase, it can then be switched into an operating position, wherein in the operating position the product gases from the reformer and/or the thermal starting device are guided to the inner region of the fuel cell, e.g. the anode.

The fuel cell system according to the invention can comprise at least one cooling channel running in at least one of the bipolar plates, and a fluid connection can be provided between the switching device and the at least one cooling channel such that the product gases are guided through the at least one cooling channel. In a constructionally simple manner, a very good heat connection can thus be achieved between the respective inner region and the respective outer region.

The fuel cell can also have additional channel structures in the outer region, which are brought into fluid connection by means of the switching device, so that the product gases are guided through the additional channel structures and/or the cooling channel, wherein the additional channel structures can be arranged in the bipolar plates. Thus, the heat connection can be improved further.

According to another constructive embodiment, the region of the input of the fuel cell anode is, for example, provided with additional channels, which run in the bipolar plates in the outer region, separately from the at least one cooling channel/ cooling channels. This embodiment allows a heating separate from the cooling device of the fuel cell, and it can thus—from a safety-related point of view—be realized more easily.

The surface of the at least one cooling channel and/or the additional channel structures can be coated with a catalyst.

Most easily, air can be used as coolant.

With regard to the avoidance of the usual difficulties of the prior art (see above), the inventive fuel cell system can particularly effectively be used when the fuel cell is a high-temperature fuel cell in a temperature range between about 100° C. to about 200° C.

In the case of the fuel cell system according to the invention, the thermal starting device can be a burner suited for a complete combustion of the fuels used.

The inventive method relates to starting and operating a fuel cell system comprising a reformer with a thermal starting device, at least one gas processing stage downstream of the reformer and at least one fuel cell disposed downstream of the gas processing stage and comprising a plurality of bipolar plates, the fuel cell having an inner region of a reaction, in particular with anode, cathode and electrolyte, and an outer region with at least one cooling channel permitting a coolant to flow through, the outer region not being in fluid connection with the inner region, wherein the reformer is heated by means of the thermal starting device. According to the invention, a switching device upstream of the fuel cell can be switched between a start-up position, wherein in the start-up position product gases from the reformer and/or the thermal starting device are at least during the starting operation guided over the outer region of the fuel cell so as to heat the fuel cell, and at least one operating position, wherein in the operating position the product gases from the reformer and/or the thermal starting device are guided to the inner region of the fuel cell.

The method for starting a fuel cell system, in particular with a high-temperature fuel cell, is characterized in that during the start-up process the combustion process is initiated by a complete combustion of fuel and air in the thermal starting device. The hot waste gas produced thereby heats components, which are located downstream of the reformer, such as gas processing stages. According to the invention, by supplying the gases, which are still hot, into the cooling channels or additional channels, a fast heating of the fuel cell is on the one hand realized by means of the thermic connection. On the other hand, the inventive spatial separation or fluid separation from the inner region, in particular the anode side, allows the fuel cell or rather the inner reaction region of the fuel cell to be gently heated up to the required working temperature. The waste gas, which has cooled down in the fuel cell, is supplied into the post-combustion, which can be a catalytic burner, and can there give off its residual heat (see also FIG. 1).

Only if the optimal reaction temperature in the reformer is reached, the amount of air, fuel and/or water is adjusted in accordance with the predetermined requirements of the partial oxidation, the autothermic reforming or the steam reforming. Initially, product gas is produced, which still contains undesired byproducts. In this phase, the product gas is still guided into the cooling channels (see also FIGS. 2a and 2b) or the additional channels of the fuel cell.

According to the method of the invention, the thermal starting device is, once the working temperature of the reformer is reached, shut off, and the product gases from the reformer are then guided over the outer region of the fuel cell, through the at least one cooling channel, which runs in the bipolar plates, until the fuel cell has reached its working temperature.

Only then is it switched into an operating position, wherein in the operating position the product gases from the reformer and/or the thermal starting device are supplied to the inner region of the fuel cell.

According to the method of the invention, the waste gases from the thermal starting device or the product gases from the reformer can be guided via additional channel structures in the outer region.

In an embodiment, the fuel cell can be a high-temperature fuel cell.

Figure 3:
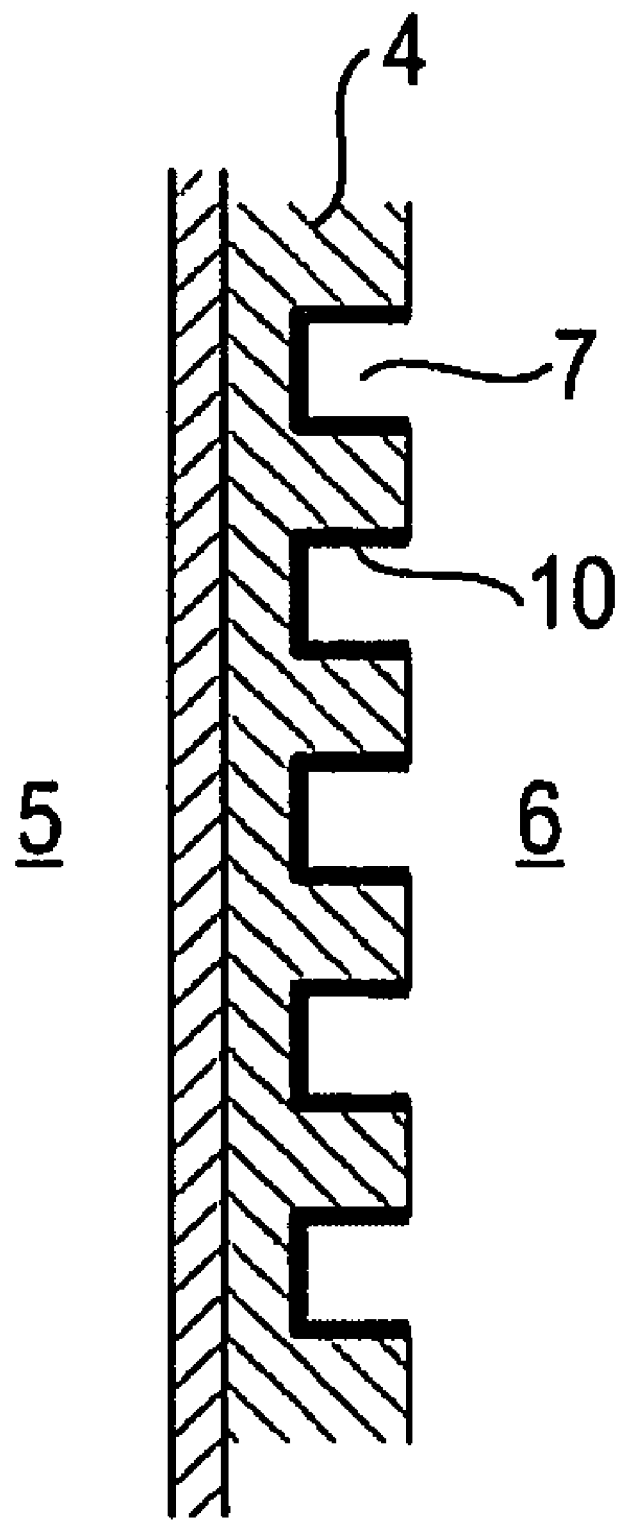
FIG. 3 depicts a bipolar plate having a coating with a catalyst material on the coolant side.

According to a constructional embodiment of the invention, the cooling channels or the additional channels are provided with a catalyst (see also FIG. 3). Due to the high content of combustible gases in the product gas, such as hydrogen, during the start-up phase of the reformer, this gas can—by adding aerial oxygen at the catalyst—thermally be converted in the cooling channels. The heat generated thereby is used for an additional heating of the fuel cell as well as a heating-up during the start-up phase. Combustible gases not converted in the channels can then completely be converted in the subsequent catalytic burner.

According to this advantageous embodiment of the high-temperature fuel cell and the respective method for operating the same, a temperature control for controlling the phase transitions is provided, wherein a means for measuring the temperature is attached to the fuel cell itself or to the output of the latter.

The invention provides in a constructionally simple manner a simple, fast and gentle start-up or operation of a fuel cell system, with a high-temperature membrane, in which the control technologies, which have been relatively complex, can be avoided, in particular during start-up processes. By the inventive interposing and controlling of a switching device, which can be a valve, such as a multiway valve, and by possibly considering a few parameters which are easy to measure, such as temperatures, a gentle heating of the fuel cell system can be ensured, and at the same time harmful substances are prevented from reaching the inner region of the sensitive fuel cell. Thus, also the reformer shows a greater robustness. It is less sensitive to forming reaction residues and humidity, as the catalyst disposed there can during the start be heated to the working temperature necessary for a soot-free operation by means of a thermal starting device, and as the reforming process can then immediately be started.

Referring now to the Figures. FIG. 1 illustrates an embodiment of the invention and shows schematically in a dashed line the interconnection of the fuel cell stack during the start-up phase and in a solid line the interconnection during the operating phase.

Figure 2:
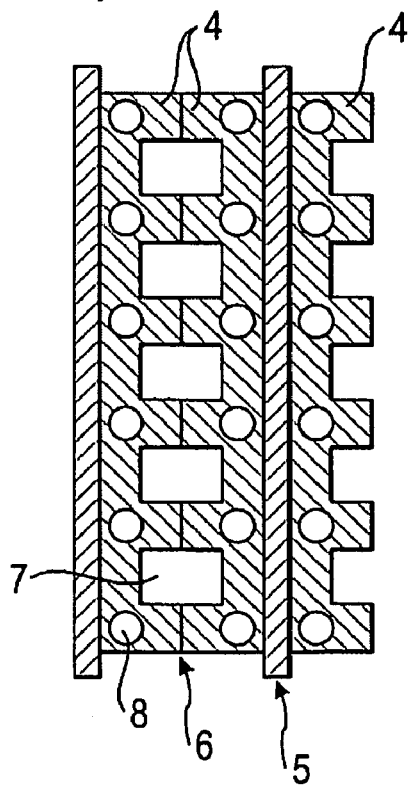
FIGS. 2a and 2b depicts a configuration of bipolar plates with cooling channels and additional channels, wherein hot product gases flow through these channels during the start-up phase.
Figure 2:
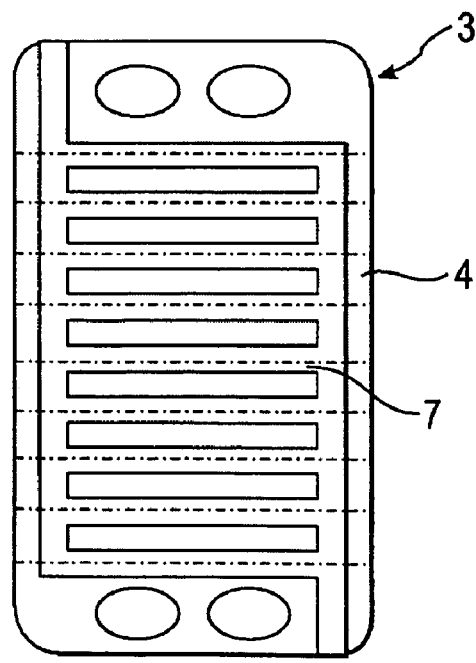

FIGS. 2a and 2b illustrate schematically the configuration of bipolar plates with cooling channels and additional channels, wherein hot product gases flow through these channels during the start-up phase.

FIG. 3 illustrates schematically a bipolar plate having a coating with a catalyst material on the coolant side.

Figure 4:
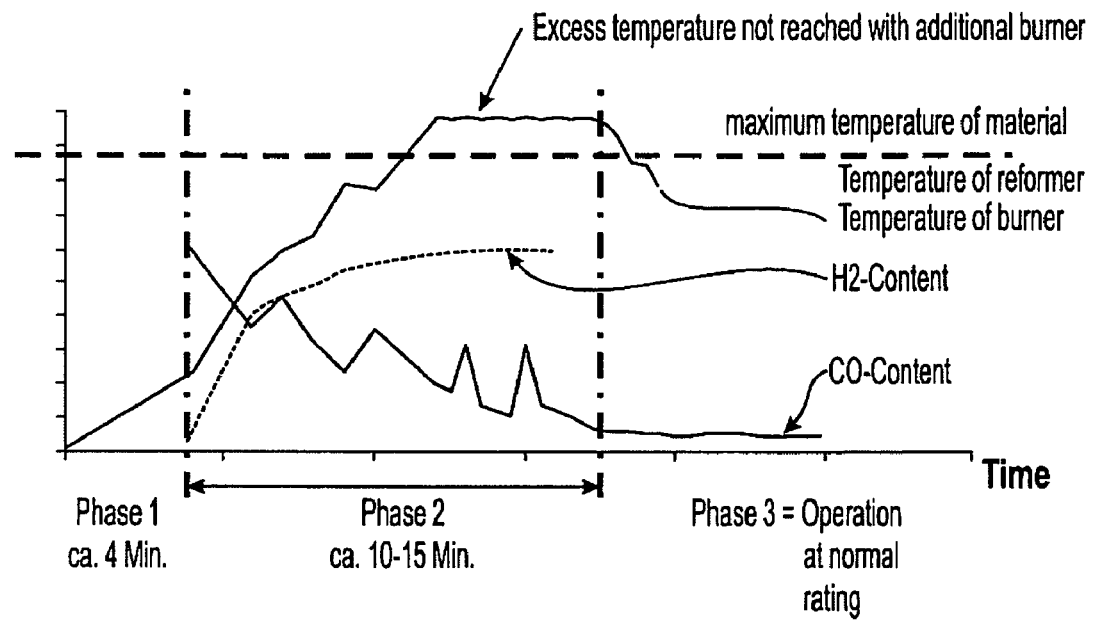
FIG. 4 depicts a chart of the typical course of the temperatures, the hydrogen content and the carbon monoxide content of a product gas from the reformer.

FIG. 4 illustrates schematically a typical course of the temperatures, the hydrogen content and the carbon monoxide content of a product gas from the reformer.

Figure 5:
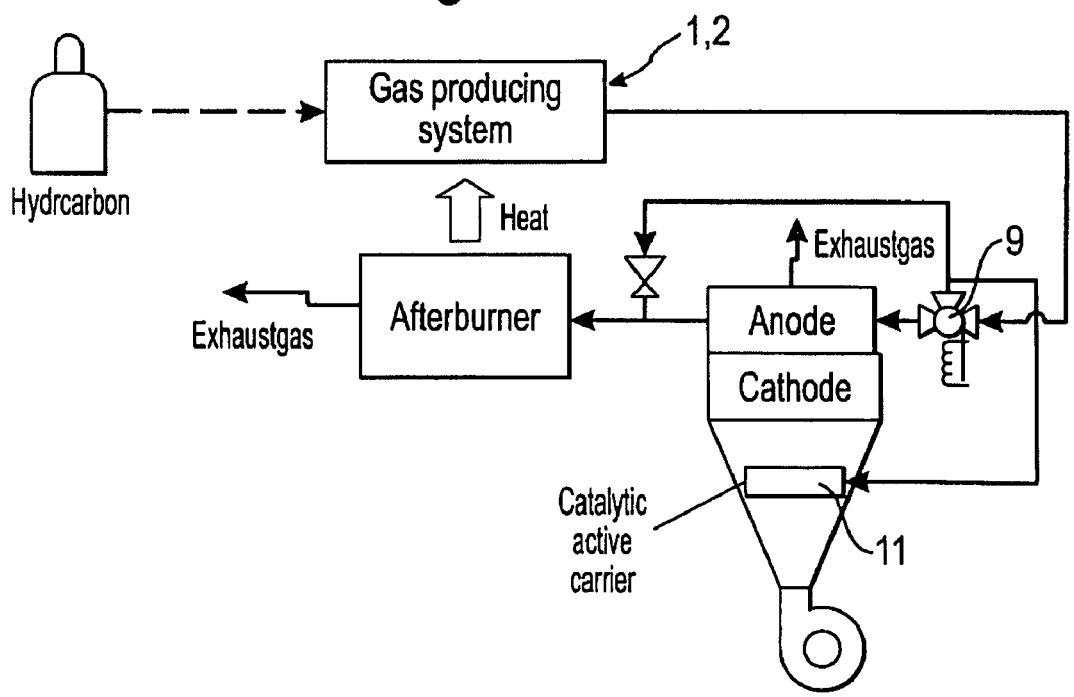
FIG. 5 depicts a further embodiment of the invention with a separate burner.

FIG. 5 illustrates schematically a further embodiment of the invention with a separate burner.

The Figures illustrate a fuel cell system or parts of this system according to embodiments of the invention. The shown fuel cell system comprises among others a reformer 1 with a thermal starting device, at least one gas processing stage 2 downstream of the reformer 1 and at least one fuel cell 3 disposed downstream of the gas processing stage 2 and comprising a plurality of bipolar plates 4, the fuel cell 3 having an inner region 5 of a reaction, in particular with anode, cathode and electrolyte, and an outer region 6 with at least one cooling channel 7 permitting a coolant to flow through, wherein the outer region 6 is not in fluid connection with the inner region 5. Further, a switching device 9 is provided upstream of the fuel cell 3, which is switchable between a start-up position, wherein in the start-up position product gases from the reformer and/or the thermal starting device are at least during the starting operation guided over the outer region 6 of the fuel cell 3 so as to heat the fuel cell 3, and at least one operating position, wherein in the operating position the product gases from the reformer and/or the thermal starting device are guided to the inner region 5 of the fuel cell 3.

As can in particular be seen in FIGS. 2a and 2b, the at least one cooling channel 7 runs in at least one of the bipolar plates 4, and a fluid connection is provided between the switching device 9 and the at least one cooling channel 7, so that the product gases are guided through the at least one cooling channel. Additionally, the fuel cell 3 has in the outer region 6 additional channel structures 8, which can be brought in fluid connection with the switching device, so that the product gases are guided through the additional channel structures 8 and at least one cooling channel 7, wherein the additional channel structures 8 are arranged in the bipolar plates 4.

As can be seen in FIG. 3, at least the surface of the cooling channels 7 in the outer region 6 of the bipolar plates 4 can be coated with a catalyst 10.

In the start-up phase, the reformer 1 is brought to operate at normal rating, as the CO content is too high in this phase due to the not (yet) stationary conditions and the still too low temperature level of the gas processing stages. Thus, the hydrogen in the product gas with a high calorific value cannot be converted in the fuel cell 3, but has to be thermally converted outside thereof, i.e. oxidized.

FIG. 4 shows a typical course of the temperatures, the hydrogen content as well as the carbon monoxide content of the product gases from the reformer in the course of three typical phases of the start/operation of the reformer.

An afterburner can be provided, which is only designed for the combustion of the low-caloric waste gases with an low hydrogen content from the fuel cell. If, during the above-described start-up phase, the product gas from the reformer were directly guided onto this afterburner, the latter would overheat.

For a complete conversion, the product gas or great parts of it can advantageously be converted in a separate burner (see FIG. 5, reference numeral 11), which can be a catalytic burner, and the waste gases from this separate burner can be used for heating the fuel cell by guiding these hot waste gases via the cooling channels, for example.

A method with the following three phases can be carried out as shown in FIG. 4.

$1^{st}$ phase: heating the system: a.) electrically b.) conventional combustion in the afterburner.

$2^{nd}$ phase: Once the ignition temperature of the reformer is reached, it is filled with fuel and air (possibly with water vapor if the heating by means of the burner was sufficient to generate water vapor). Thereby, the generation of product gas with hydrogen and high concentrations of carbon monoxide takes place in the reformer, which needs to be guided around the fuel cell (start-up position). This is carried out until the working temperatures of all gas generation steps are at nominal working temperature.

Then, the product gas from the reformer with high CO concentrations is combusted: a.) in the afterburner to the extent allowed by the thermal restriction of the material or catalyst in the burner b.) the whole content in a separate catalytic burner which is either located in the exhaust air line of the whole system (no further thermal use) or in the device upstream of the fuel cell for heating the same. Thereby, the cooling fan can at the same time be used as air conveyor means for the combustion air for oxidizing the product gases from the reformer.

$3^{rd}$ phase: operation at normal rating, switching device 9 being switched to operating position.

In the $1^{st}$ phase, for example, the catalyst of the reformer or the catalytic afterburner is heated to the light-off temperature of the catalyst lying in a range of about 250° C. to about 500° C., by the thermal starting device, by an electrical heating of the catalyst or the educts, which, in the $1^{st}$ phase, flow through the catalyst. The heating time depends on the thermal mass and amounts in a sufficiently dimensioned heat carrier to about 2 minutes to about 10 minutes.

In the $2^{nd}$ phase, the catalyst is for the reforming for example charged with hydrocarbons and substoichiometrically supplied air in the range of air lambda about 0.1 to about 0.8, so that the catalyst reacts exothermally up to its working temperature in the range of about 500° C. to about 900° C. In order to enable a very short start-up time and to quickly reach the working temperature in the reformer and particularly the subsequent gas processing stages, the educts can be dosed in accordance with the nominal load.

The $2^{nd}$ phase lasts for example until the gas processing stages are at working temperature and the CO concentrations are between about 20 ppm and about 200 ppm, for a low-temperature fuel cell and about 1 percent to about 3 percent for a high-temperature fuel cell. The operating time of the $2^{nd}$ phase depends on the thermal masses of the catalysts as well as their conversion characteristics, which are subject to the temperature, and lies in the case of a sufficient dimensioning between about 2 minutes and about 50 minutes.

In the $2^{nd}$ phase, the hydrogen generated in the reformer cannot be converted in the fuel cell due to the activated diversion routing the product gases around the fuel cell (start-up position). According to an embodiment of the invention, this hydrogen is to be combusted in a separate burner (see FIG. 5, reference numeral 11), a catalytic burner, for example by supplying additional aerial oxygen in the over-stoichiometrically air ratio from 1.1 to 4.5. The heat resulting therefrom can be used for heating the system components, in particular for high-temperature fuel cells. When heating a high-temperature fuel cell, it is to be heated up to a working temperature of about 140° C. to about 200° C., until the operating phase ($3^{rd}$ phase) or operation at normal rating can be carried out.

FIG. 5 illustrates schematically a further embodiment of the invention, wherein a separate burner 11, in the shown example a catalytic burner, is arranged in the region of the additional channel structures or the at least one cooling channel as catalytic coating.

While these embodiments have been described with emphasis on the embodiments, it should be understood that within the scope of the appended claims, the embodiments might be practiced other than as specifically described herein.

What is claimed is:

1. A fuel cell system comprising:
   a. a reformer with a thermal starting device;
   b. at least one gas processing stage downstream of the reformer;
   c. at least one fuel cell disposed downstream of the at least one gas processing stage comprising:
      (i) a plurality of bipolar plates;
      (ii) an inner region of a reaction with an anode, a cathode and an electrolyte; and
      (iii) an outer region with at least one cooling channel permitting a coolant to flow through the cooling channel, the outer region not being in fluid connection with the inner region;
   d. a switching device provided upstream of the fuel cell, which is switchable between a start-up position, wherein in the start-up position product gases from the reformer are at least during a starting operation are guided through the outer region of the fuel cell so as to heat the fuel cell; and
   e. at least one operating position, wherein in the operating position the product gases from the reformer are guided to the inner region of the fuel cell.

2. The fuel cell system of claim 1, wherein the at least one cooling channel runs in at least one of the bipolar plates and that a fluid connection is provided between the switching device and the at least one cooling channel, so that the product gases are guided through the at least one cooling channel.

3. The fuel cell system of claim 2, wherein the fuel cell has additional channel structures arranged in the bipolar plates and located in the outer region of the fuel cell, and wherein the additional channel structures are connected to the switching device so that product gases can be guided through the at least one cooling channel, the additional channel structures, or combinations thereof.

4. The fuel cell system of claim 3, wherein the surface of the at least one cooling channel, additional channel structures, or combinations thereof are coated with a catalyst.

5. The fuel cell system of claim 3, wherein the coolant is air.

6. The fuel cell system of claim 1, wherein the fuel cell is a high-temperature fuel cell in a temperature range between 100° C. to 200° C.

7. The fuel cell system of claim 3, wherein the system further comprises a separate burner arranged in the region of the additional channel structures, the at least one cooling channel, or combinations thereof.

8. The fuel cell system of claim 1, wherein the thermal starting device is a burner suited for a complete combustion of the fuels used.

9. A method for starting and operating a fuel cell system comprising:
   a reformer with a thermal starting device, at least one gas processing stage downstream of the reformer forming product gases and at least one fuel cell disposed downstream of the gas processing stage and comprising a plurality of bipolar plates, the fuel cell having an inner region of a reaction with an anode, a cathode and an electrolyte, and an outer region with at least one cooling channel arranged in the bipolar plates to permit a coolant to flow through the cooling channel, the outer region not being in fluid connection with the inner region, wherein the reformer is heated with the thermal starting device, comprising the steps of:
   a. heating the reformer with the thermal starting device;
   b. switching between a start-up position and at least one operating position to guide the product gases to the inner region of the fuel cell; and
   c. shutting off the thermal starting device, once a working temperature of the reformer is reached and guiding the product gases from the reformer through the outer region of the fuel cell through the at least once cooling channel in the bipolar plates, until the fuel cell has reached its working temperature.

10. The method of claim 9, wherein the method further comprises the step of guiding exhaust gases from the thermal starting device or the reformer to additional channel structures in the outer region.

11. The method of claim 9, wherein the fuel cell is a high-temperature fuel cell.

12. The method of claim 9, wherein the method further comprises the step of chemically converting the product gases from the reformer with a separate burner, a cooling channel, additional channel structures, or combinations thereof, for generating additional heat.

13. The method of claim 12, wherein the conversion of the product gases takes place in a start-up phase upon switching the reformer in the start-up position.

14. The method of claim 13, wherein during the start-up phase, the reformer is heated to a normal rating, converting the excessive hydrogen in the reformer in the separate burner by adding air.

15. The method of claim 12, wherein the generated heat is used for preheating system components.

* * * * *